United States Patent [19]

Boothroyd et al.

[11] Patent Number: 5,422,837
[45] Date of Patent: Jun. 6, 1995

[54] APPARATUS FOR DETECTING DIFFERENCES BETWEEN DOUBLE PRECISION RESULTS PRODUCED BY DUAL PROCESSING UNITS OPERATING IN PARALLEL

[75] Inventors: Donald C. Boothroyd, Phoenix; Bruce E. Flocken; Minoru Inoshita, both of Glendale, all of Ariz.

[73] Assignee: Bull HN Information Systems Inc., Billerica, Mass.

[21] Appl. No.: 168,114

[22] Filed: Dec. 14, 1993

[51] Int. Cl.⁶ .......................... G06F 7/02; G06F 9/26; G06F 9/345; G06F 11/10

[52] U.S. Cl. ................................... 395/800; 364/229.5; 364/238.7; 364/240; 364/242.91; 364/243.41; 364/246.7; 364/246.5; 364/252.2; 364/255.4; 364/255.7; 364/255.8; 364/258.4; 364/259; 364/259.2; 364/260.2; 364/263.3; 364/DIG. 1; 364/DIG. 2

[58] Field of Search ............... 395/575, 800, 500, 550, 395/200, 325, 250, 775, 275, 375, 425; 364/DIG. 1, DIG. 2; 371/68.1, 68.2, 68.3, 9.1, 37.2, 37.3, 37.4, 37.6, 37.7, 49.1, 49.2, 51.1, 49.4, 40.2, 40.4, 24

[56] References Cited

U.S. PATENT DOCUMENTS

| | | |
|---|---|---|
| 4,358,823 | 11/1982 | McDonald et al. ................ 371/9.1 |
| 4,843,608 | 6/1989 | Fu et al. ........................... 371/68.1 |
| 4,849,979 | 7/1989 | Maccianti et al. ................ 371/68.3 |
| 4,856,000 | 8/1989 | Bauge et al. ...................... 371/9.1 |
| 5,148,538 | 9/1992 | Celtruda et al. .................. 395/375 |
| 5,276,822 | 1/1994 | Maekawa et al. ................. 395/375 |

Primary Examiner—Alyssa H. Bowler
Assistant Examiner—Daniel H. Pan
Attorney, Agent, or Firm—J. S. Solakian; J. H. Phillips

[57] ABSTRACT

In order to validate data manipulation results in a CPU which incorporates duplicate BPUs for integrity, which BPUs are typically each implemented on a single VLSI circuit chip, and which is capable of performing single and double precision data manipulation operations, two cache units are employed. Each cache unit is dedicated to handling half-bytes of information and incorporates highly reliable data validating logic without the necessity for providing double word wide output busses from each BPU. This feature, which lowers the lead count to each VLSI chip, is obtained by dedicating each cache unit to handling half-bytes of information. Each cache unit includes bit-by-bit comparison circuitry to validate the half-byte results received from both BPUs in the case of single precision operations, and, in the case of double precision operation, one cache unit employs the same bit-by-bit comparison circuitry to validate, for both cache units, the result parity bits, and hence the half-byte results, received from both BPUs.

9 Claims, 4 Drawing Sheets

ID DIFFERENCES
APPARATUS FOR DETECTING DIFFERENCES BETWEEN DOUBLE PRECISION RESULTS PRODUCED BY DUAL PROCESSING UNITS OPERATING IN PARALLEL

FIELD OF THE INVENTION

This invention relates to the art of data processing and, more particularly, to a central processing unit (CPU) using dual basic processing units (BPUs), dual cache units and a combined result bus to obtain a double word result while maintaining high data integrity.

BACKGROUND OF THE INVENTION

Powerful and reliable mainframe CPUs may incorporate duplicate BPUs which work independently to execute the same instruction or instruction series in parallel such that the results can be compared to insure identity. It has now become feasible to incorporate an entire BPU on a single Very Large Scale Integrated (VLSI) circuit which has the advantage of not only occupying less space, but also enjoys the capability to run faster. However, there is a practical limit to the number of conductive leads which can be connected to a VLSI circuit, and this characteristic becomes a problem when double precision data manipulation is performed. This problem arises because each of the duplicate BPUs has typically required a double word result bus which, for example in one computer family in which the present application finds application, means the provision of two 80-bit result buses, one coupled to each BPU. Those skilled in the art will appreciate that it would be highly desirable to obtain reliable double precision results without the necessity to provide double word result buses from each of duplicate BPUs. This has been achieved according to the invention set forth in U.S. patent application Ser. No. 08/065,105 filed May 19, 1993, entitled CENTRAL PROCESSING UNIT USING DUAL BASIC PROCESSING UNITS AND COMBINED RESULT BUS, by Donald C. Boothroyd et al and assigned to the same Assignee as the present application, now United States Patent.

In some critical environments and to further distinguish the fault tolerant performance of a mainframe CPU, particularly in a multi-processor environment, it is desirable to achieve even further confidence in the results of double precision bit manipulations and the integrity of the results. The present invention is directed to this end and to obtaining other desirable results which are a consequence of the implementation of the invention.

OBJECTS OF THE INVENTION

It is therefore a broad object of this invention to provide an improved CPU which incorporates duplicate BPUs for integrity, which BPUs are typically each implemented on a single VLSI circuit chip, and which is capable of performing single and double precision data manipulation operations.

It is a more specific object of this invention to provide a CPU incorporating duplicate BPUs and two cache units, each cache unit dedicated to handling half-bytes of information and incorporating highly reliable data validating logic without the necessity for providing double word wide output busses from each BPU, in which cache unit, ongoing bit manipulations of the duplicate BPUs are compared during periods intermediate successive cache stores.

SUMMARY OF THE INVENTION

Briefly, these and other objects of the invention are achieved by providing a CPU incorporating duplicate BPUs and two cache units, each cache unit being dedicated to handling half-bytes of information. Each cache unit includes bit-by-bit comparison circuitry to validate the half-byte results received from both BPUs in the case of single precision operations, and, in the case of double precision operation, one cache unit employs the same bit-by-bit comparison circuitry to validate, for both cache units, the result parity bits, and hence the half-byte results, received from both BPUs. In addition during double precision operations, an adder situated in each BPU sums the intermediate (non-stored) results from the data manipulation logic circuitry and transfers each sum to an accumulator. Since the accumulated sum in both BPUs should always be the same, this sum can be compared intermediate successive cache store by the same bit-by-bit circuitry employed to validate the result parity bits during double precision cache store operations. If the sums do not compare exactly, remedial action, such as a CPU freeze followed by fault analysis, can be undertaken.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
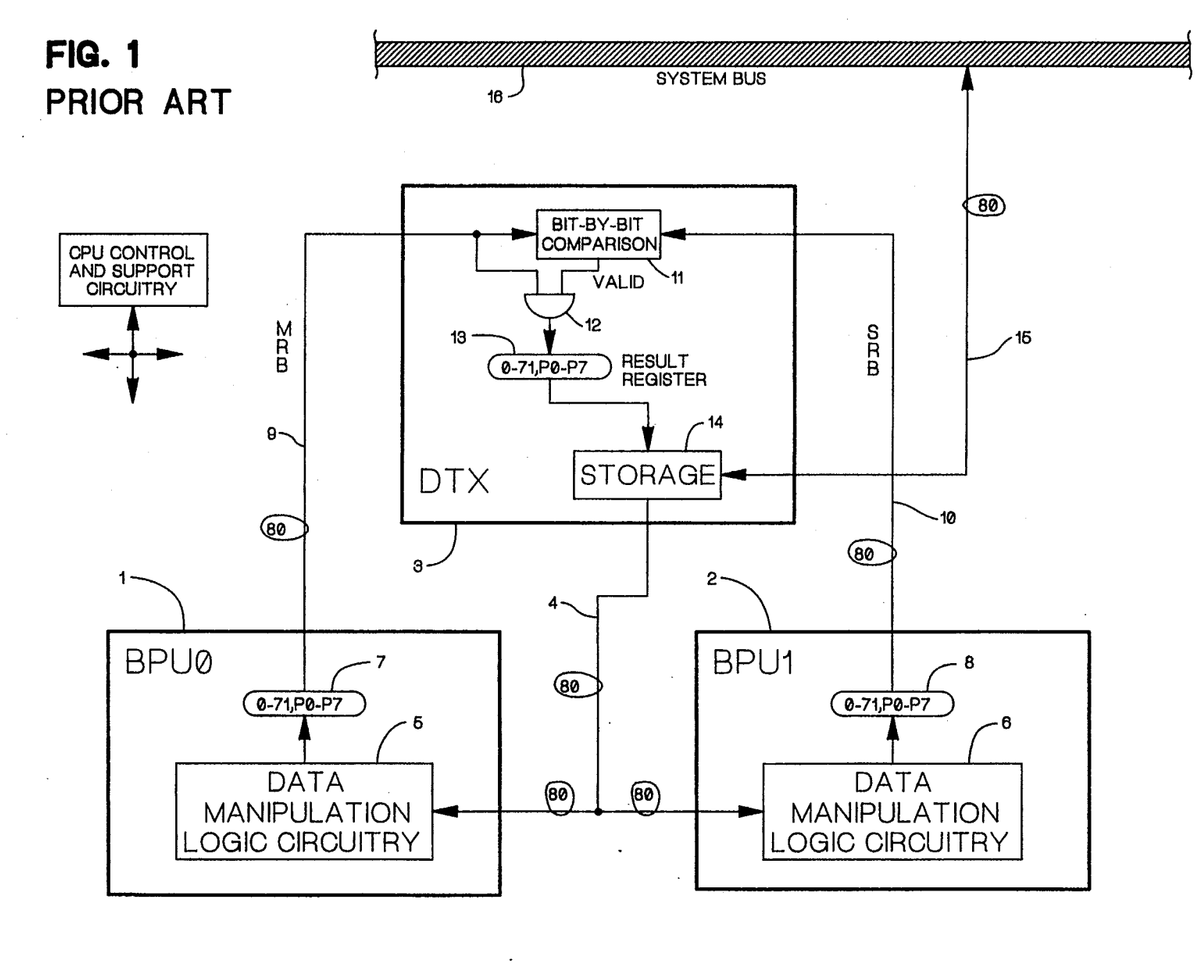
FIG. 1 is a block diagram of a typical prior an CPU incorporating duplicate BPUs and capable of performing single and double precision data manipulation and storing validated results in a cache memory.

Referring first to FIG. 1, there is shown a block diagram of a typical prior art CPU incorporating duplicate BPUs, which CPU is capable of performing single and double precision data manipulation and storing the validated results in an internal cache memory. In the exemplary system, a data word is 36 bits wide, and each 9-bit data byte carries its own parity bit such that each full byte is 10 bits wide with the parity bit placed in the least significant bit position. Thus, a full single precision 4-byte word with parity information is 40 bits wide, and a double precision 8-byte word is 80 bits wide.

A first BPU (BPU0) 1 may be deemed the "master" BPU, and a second BPU (BPU 1) 2 is the "slave" BPU. In operation, both BPUs 1, 2 receive the same information from a cache unit (DTX) 3, via 80-bit wide BPU input bus 4, and perform the same operations in redundant fashion in their respective data manipulation logic circuitry blocks 5, 6. The results, which should be identical, appear in respective buffer registers 7, 8. In the case of single precision operations, depending upon a given CPU design, only half the buffer registers 7, 8 may be used, or the single precision results may be duplicated in the upper and lower halves of each of the buffer registers. In the case of double precision operations, of course, each result is 80 bits wide. The master results are transferred to the cache unit 3 on master result bus (MRB) 9 while the slave results are similarly transferred to the cache unit on slave result bus (SRB) 10.

The results of each data manipulation operation, as obtained by each of the master and slave BPUs 1,2, are compared, bit-by-bit, in comparison block 11 within the cache unit 3. (Bit-by-bit comparison circuits are well known in the art; for example, reference may be taken to the relevant disclosure, incorporated herein, in U.S. Pat. No. 5,195,101, the invention of which is assigned to the same Assignee as the subject invention.) If the results are identical, a "valid" signal issued by the comparison block 11 enables AND-gate array 12 to permit the master results to be transferred to result register 13 and thence to storage block 14. (It will be understood that if the results are invalid, appropriate error handling operations will be undertaken. ) Information stored in or to be stored into the cache unit 3 may be made available to or received from other system components (e.g., other CPUs, I/O units, main memory, etc., not shown) via 80-bit wide input/output bus 15 and system bus 16 in the manner well known in the art. Support components, such as clock generation logic, error handling logic, directories, etc., effecting the rest of the CPU are represented by block 17.

It will be observed that both the MRB and the SRB are 80-bits wide such that, if a BPU is implemented on a single VLSI chip, the configuration of FIG. 1, which is capable of high performance in carrying out both double precision and single precision data manipulation operations, may not be usable because of the practical limitation on the number of conductive connections that can reliably be made to a single very dense and physically small VLSI chip.

Figure 2:
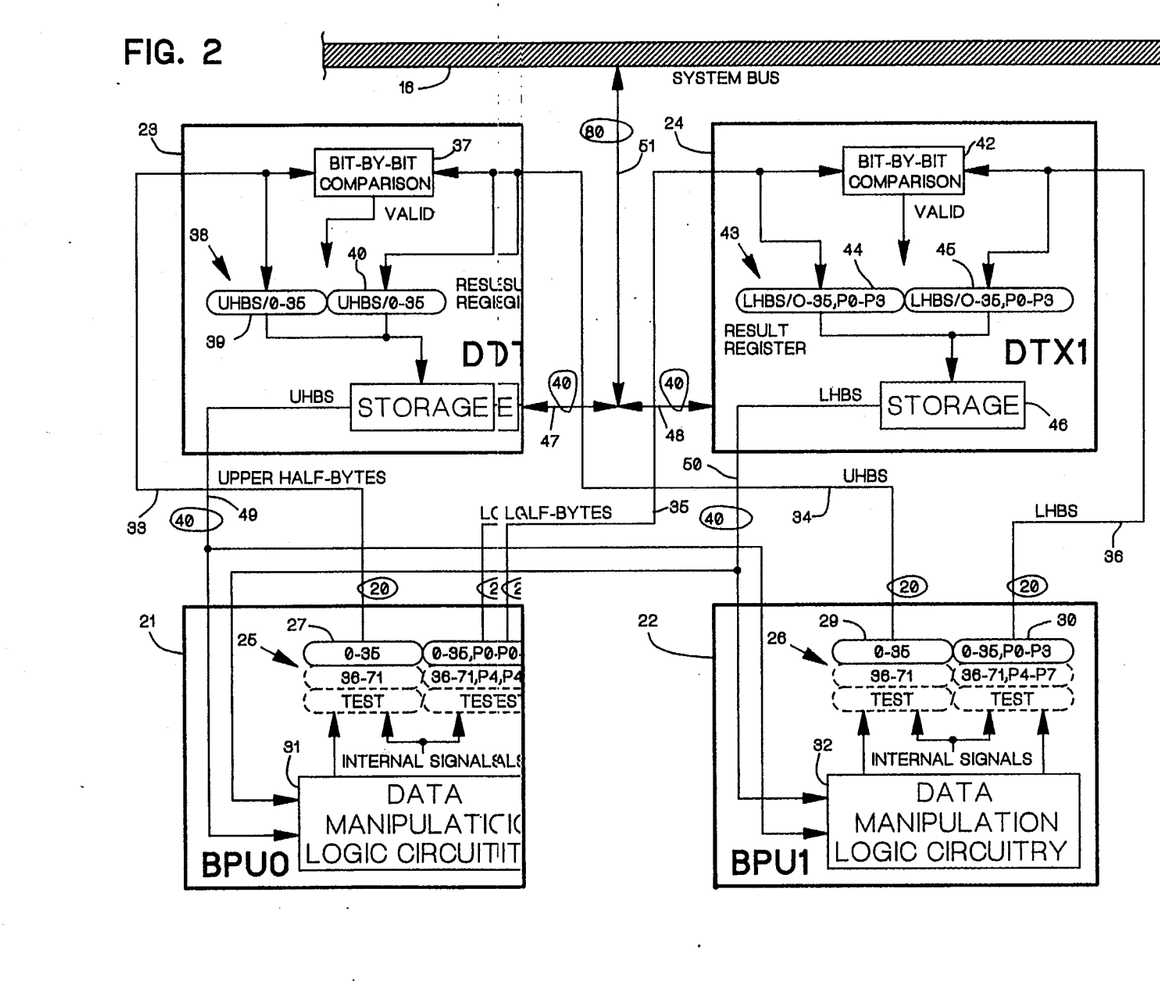
FIG. 2 is a block diagram of a CPU in which the present invention finds use, which CPU is shown configured to execute single precision data manipulation operations and cache stores.

Attention is now directed to FIG. 2 which illustrates in block diagram form the logic by which this obstacle has been overcome in the performance of single precision data manipulation operations, the corresponding method becoming evident from the following description. In this configuration, BPU0 21 and BPU1 22 are not related as master and slave, but rather are peers which, however, receive identical information on which to perform data manipulations in a manner similar to that performed by the BPUs previously discussed and shown in the prior art configuration of FIG. 1. BPU0 21 and BPU1 22 each communicate with cache units DTX0 23 and DTXI 24. Each buffer multiplexer, 25, 26, respectively, receives the results of a given data manipulation performed by the respective logic blocks 31, 32 into upper half-byte sections 27, 29 and lower half-byte sections 28, 30. The upper half-bytes from the buffer register sections 27, 29 are transferred to the cache units 23,24 via respective 20-bit wide UHB busses 33, 34. Similarly, the lower half-bytes from the buffer register sections 28, 30 are transferred to the cache unit 23, 24 via respective 20-bit wide LHB busses 35, 36. Since, in the exemplary system, each data byte includes a panty bit in the least significant bit position, all the parity bits are resident in the lower half-bytes which are transferred to the cache unit 24.

For single precision operations, the exemplar,.,, system duplicates the results in the upper 27, 29 and lower 28, 30 halves of the buffer registers 25, 26 and in the cache units 23, 24. Those skilled in the art will understand that this design choice, which is also adaptable to systems in which only single, non-duplicated, word results are stored for single precision operations, offers certain performance advantages.

In the cache unit DTX0 23, the upper half-bytes from each of the BPU0 21 and BPU1 22 are compared for identity in the bit-by-bit comparison logic block 37 which issues a "valid" signal to transfer the data from BPUs 21, 22 into respective first 39 and second 40 halves of result register 38 and thence to storage block 41. Similarly, in the cache unit DTXI 24, the lower half-bytes from each of the BPU0 21 and BPU1 22 are compared for identity in the bit-by-bit comparison logic block 42 which issues a "valid" signal to transfer the data from BPUs 21, 22 into respective first 44 and second 45 halves of result register 43 and thence to storage block 46. (For simplicity, the AND-gate arrays which correspond to AND-gate array 12 shown in FIG. 1 and which are responsive to the "valid" signals have been omitted.)

Thus, at the end of a data manipulation operation, the results, having been compared for identity and found valid, will have been stored into cache storage with the upper half-bytes stored in duplicate in the storage block 41 in cache unit DTX0 23 and the lower half-bytes stored in duplicate in the storage block 46 of cache unit DTX1 24. 40-bit wide local input/output busses 47, 48 combine into 80-bit wide input/output bus 51 which is coupled to the system bus 16 for communication between the cache units 23,24 with other system components. 40-bit wide cache-to-BPU busses 49, 50 are respectively used to transfer upper half-byte and lower half-byte data from the cache units 23, 24 to the BPUs 21, 22 for the subsequent performance of identical data manipulation operations.

It will be observed that, for single precision operations as illustrated in FIG. 2, the data output lines comprising the busses 33, 34 and 35, 36 from each of the BPUs 21, 22 to the cache units 23, 24 are only 40 lines, rather than 80 lines, wide such that the line counts to the VLSI chips incorporating the BPUs are reduced accordingly.

Figure 3:
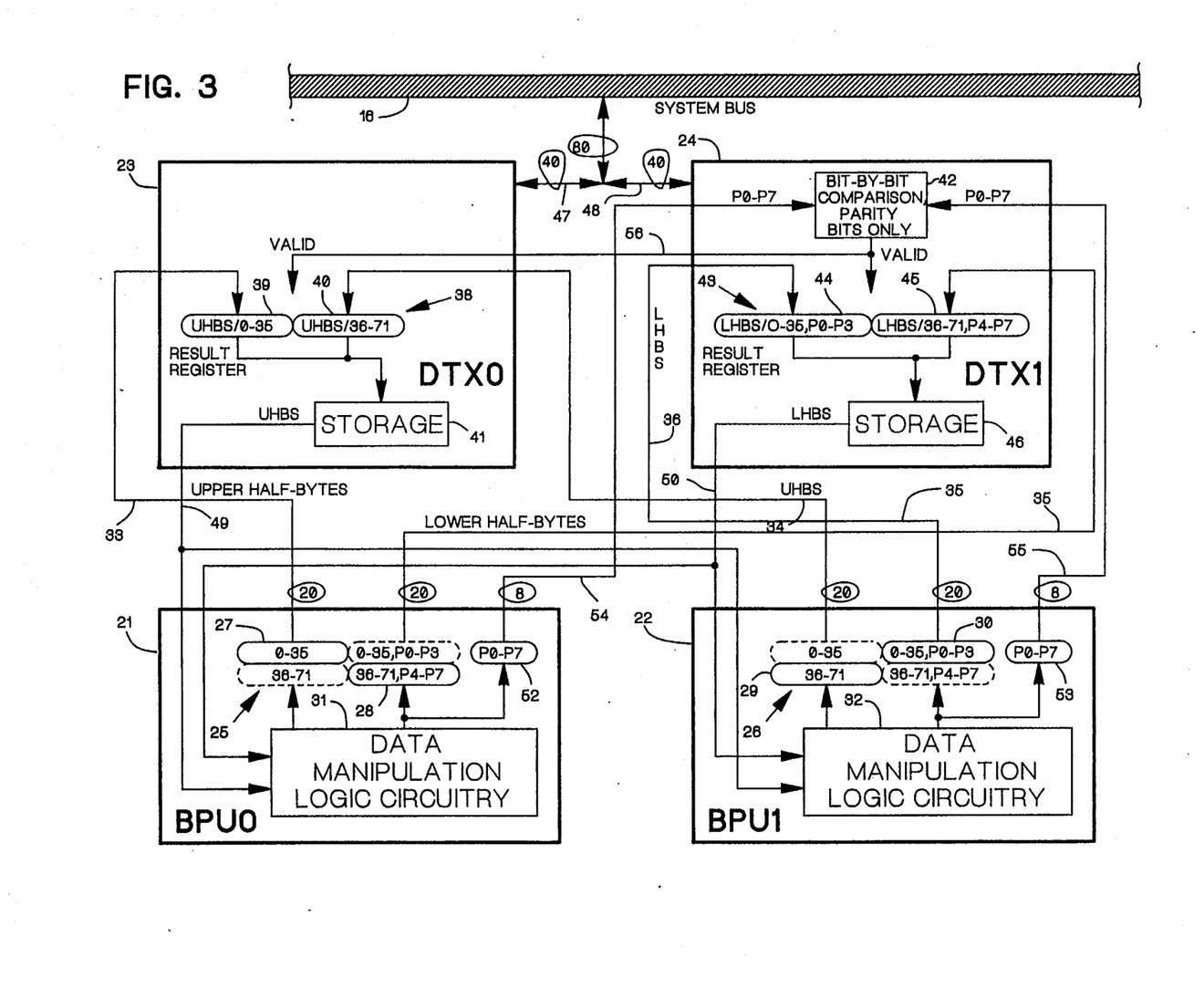
FIG. 3 is a block diagram of the CPU also shown in FIG. 2, which CPU is shown configured to execute double precision data manipulation operations and cache stores.

Consider now the same apparatus as it performs double precision operations. Referring to FIG. 3, assume that the data manipulation blocks 31, 32 in the BPUs 21, 22 have been assigned a double precision operation. The double precision results will be placed in the buffer multiplexers 25, 26 such that: 1) the upper half-bytes of the low order word (data bits 0–35) are placed in the buffer register section 27 of the buffer multiplexer 25; 2) the upper half-bytes of the high order word (data bits 36–71) are placed in the buffer register section 29 of the buffer multiplexer 26; 3) the lower half-bytes (which include the parity bits) of the low order word (data bits 0–35) are placed in the buffer register section 28 of the buffer multiplexer 25; and the lower half-bytes (which include the parity bits) of the high order word (data bits 36-72) are placed in the parity buffer register section 30 of the buffer multiplexer 26. In addition, parity bit buffer registers 52, 53 in, respectively, the BPU0 21 and BPU1 22 receive the parity bits 0-7; i.e., each parity buffer register is loaded with a complete set of the parity bits present in the result generated by the data manipulation logic block resident in its BPU.

The complete sets of parity bits are respectively conveyed from the parity bit buffer registers 52, 53 to bit-by-bit comparison block 42 in cache unit DTX1 24 via parity busses 54, 55. If the two sets of parity bits are identical, the "valid" signal issues in the cache unit DTX1 24 to admit the lower half-bytes from each of the BPUs 21 and 22 into the result register 43 and thence to the storage block 46. In addition, this "valid" signal is coupled to the DTX0 23 by line 56 to enable the transfer of the upper half-bytes from each of the BPUs 21 and 22 into the result register 38 and thence to the storage block 41. Therefore, the complete, validated double precision result is stored in cache memory, the combination of the storage blocks 41 and 46, from which the data can be read to the BPUs 21 and 22 and/or the system bus 16 as previously described with respect to single precision operations.

In the case of double precision operations as illustrated in FIG. 3, the data output lines comprising the busses 33, 34, 54 and 35, 36, 55 from each of the BPUs 21, 22 to the cache units 23, 24 are 48 lines rather than 80 lines, wide such that the line counts to the VLSI chips incorporating the BPUs are reduced accordingly. Since the same apparatus is employed for both single and double precision operations, it is this reduction from 80 to 48 output lines per BPU which represents the effective advantage over the prior art configuration shown in FIG. 1.

As previously mentioned, in some critical environments and to further distinguish the fault tolerant performance of a mainframe CPU, particularly in a multi-processor environment, it is desirable to achieve even further confidence in the results of double precision bit manipulations and the integrity of the results. Attention in now directed to FIG. 4 in which the apparatus previously discussed in conjunction with FIGS. 2 and 3 is shown in the non-storing configuration in which the operation of the subject invention may best be illustrated.

Figure 4:
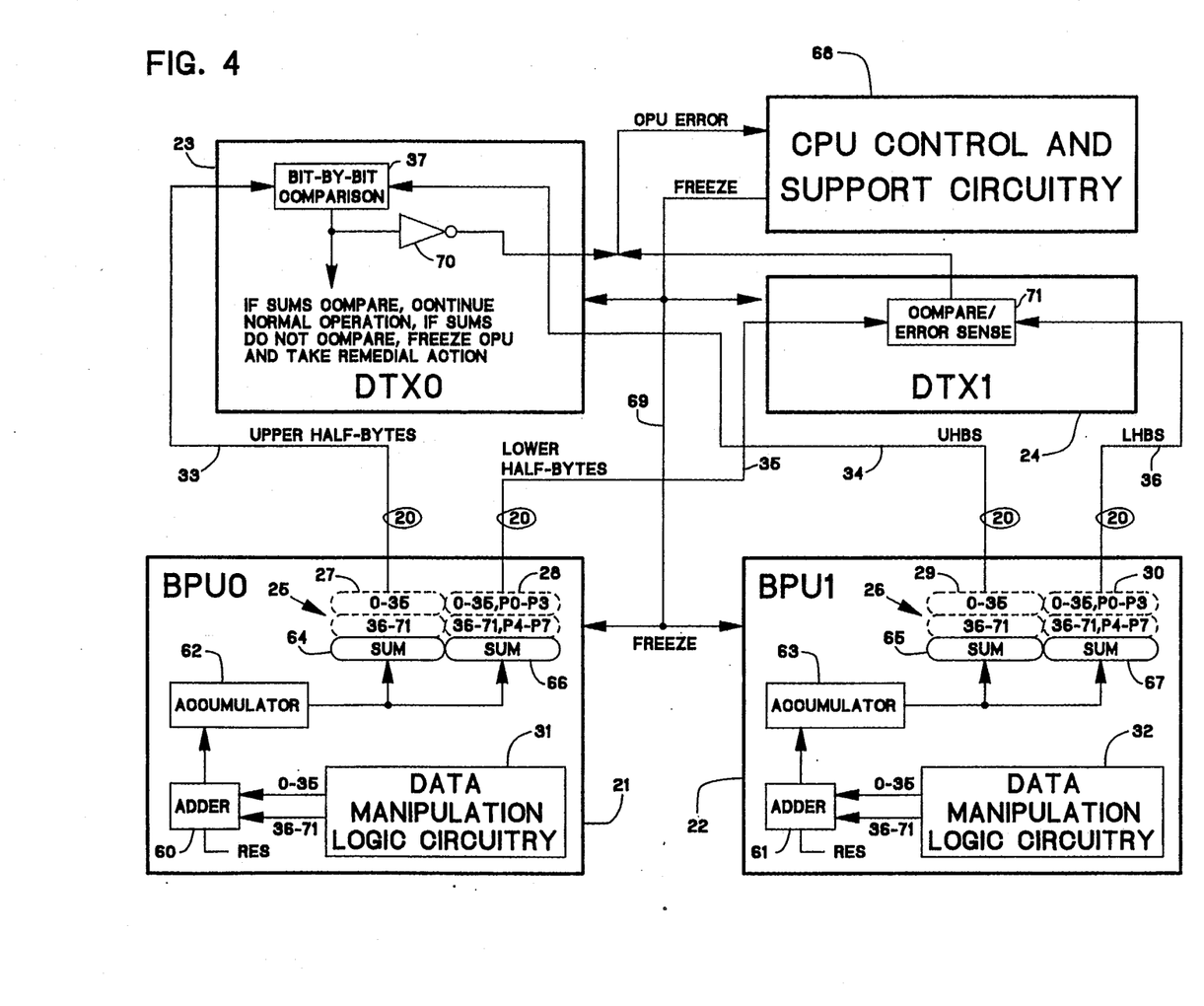
FIG. 4 is a block diagram of the CPU also shown in FIGS. 2 and 3, which CPU is shown configured to execute double precision data manipulation operations and operating between cache stores, during which period, double precision supplementary data verification is performed according to the present invention.

Referring to BPU0 21, during non-store operations, each low order word and high order word result (bits 0-35 and bits 36-71, respectively) from the data manipulation logic circuitry is applied to adder 60 where they are added. This single word sum of the two words is transferred to a single word (36 bits in the example) accumulator 62 where it is added to the contents already resident in the accumulator. In each case, overflows may be discarded, and the adder 60 conventionally reset after each addition result has been transferred to the accumulator. The accumulator 62 contents an accumulator data word, are continuously furnished to buffer register sections 64, 66 of buffer multiplexer 25. During non-store operations, the buffer register sections 64, 66 are enabled to transfer the instant upper and lower half-byte contents of the accumulator 62 (including parity bits if desired) respectively: 1) onto UHB bus 33 and to bit-by-bit comparison logic block 37 in DTX0 23 as a first input to be compared with a second input from BPU1 22; and 2) onto LHB bus 35 and to comparison/error sense logic block 71 (which includes bit-by-bit comparison logic block 42 previously discussed) in DTX1 24 as a first input to be compared with a second input from BPU1 22.

BPU1 22 incorporates identical circuitry including adder 61, accumulator 63 and accumulator half data word buffer register sections 65, 67 of buffer multiplexer 26. Thus, during non-store operations, the buffer register sections 65, 67 are enabled to transfer the instant upper and lower half-byte contents of the accumulator 63 respectively: 1) onto UHB bus 34 and to bit-by-bit comparison logic block 37 in DTX0 23 as a second input to be compared with the first input received from BPU0 21; and 2) onto LHB bus 36 and to comparison/error sense logic block 71 in DTX1 24 as a second input to be compared with the first input received from BPU0 21.

Since the upper half-bytes of the sums resident in the accumulators 62, 63 applied to the bit-by-bit comparison logic block 37 should always be identical, the expected output is a "compare" signal (e.g., a logic "1"). In this example, the issuance of a "no compare" signal (logic "0") results in enabling inverter 70 which issues a "CPU error" signal to direct the CPU control and support circuitry block 68 to analyze the problem and take corrective action which could include stopping the BPUs 21, 22 (as by issuing a "freeze" signal on line 69) and, if the system includes multi-processors, transferring the responsibilities of the failed CPU to one or more other CPUs.

Similarly, the lower half-bytes of the sums resident in the accumulators 62, 63 applied to the compare/error sense logic block 71 (which incorporates circuitry identical to the bit-by-bit comparison block 37 and inverter 70 and operates in the same manner) such that a mis-compare results in the issuance of a "CPU error" signal from DTXI 24 to CPU control and support circuitry block 68.

As an example of error handling apparatus and procedures responsive to the issuance of a "CPU error" signal, one may refer to co-pending U.S. patent application Ser. No. 07/682,801 filed Apr. 9, 1991, entitled SAFESTORE FRAME IMPLEMENTATION IN A CENTRAL PROCESSOR by Lowell D. McCulley et al and assigned to the same Assignee as the present application, now United States Patent.

Those skilled in the art will understand that the logic circuitry shown in the various figures has been somewhat simplified for clarity in disclosing the principles of the invention and may be varied to best suit the circuit family in a given system.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a central data processor for executing double precision data manipulation operations on data words including;
    A) first and second basic processing units (BPUs), each of said BPUs having the capability of executing in parallel the same double precision data manipulation operation on the same data words;
    B) first and second cache units, each of said cache units having the capability of executing a plurality of cache operations including a cache data word store operation for storing a single data word;

C) each of said first and second BPUs including;
1) data manipulation logic circuitry for receiving data words from said cache units, one from each cache unit, with each data word consisting of an even number of bytes and each byte consisting of a given number of bits, and for executing a double precision data manipulation operation thereon to produce an upper order and a lower order data word;

D) each of said first and second cache units including;
1) bit-by-bit comparison means to which can be connected two half data words applied to the cache unit for issuing a validating signal if the bits of the two half data words connected thereto are identical and for issuing an error signal if they are not; and
2) storage means for storing data words, said storage means storing a single data word applied to the cache unit while the cache unit is executing a cache data word store operation if the bit-by bit comparison means issues a validating signal;

E) CPU control and support circuitry means for issuing a freeze signal to the first and second BPUs upon the receipt of an error signal from the comparison circuit means of the cache units, the receipt of a freeze signal by the first and second BPUs stopping the operation thereof;

wherein the improvements comprise:

F) providing each of the first and second BPUs with;
1) circuit means connected to the data manipulation logic and to which is applied the upper and lower order data words produced by said data manipulation logic circuitry as the result of executing a double precision data manipulation operation for producing a data word which is a function of said upper and lower order data words applied thereto, hereafter a function data word;
2) circuit means for applying one half of the function word produced by the first BPU, hereafter the first function word to the first cache unit and the other half of said first function word to the second cache unit, and for applying one half of the function word produced by the second BPU, hereafter the second function word, corresponding the one half of the first function word applied to the first cache unit, and the other half of the second function word to the second cache unit if the cache units are not performing a cache data word store operation;
3) the bit-by-bit comparison means of each of the cache units for comparing corresponding bits of the corresponding halves of the first and second function words and for producing an error signal if they do not compare; and
6) circuit means for applying error signals produced by the bit-by-bit comparison means of the cache unit to the CPU control and support circuitry means;

whereby differences between the upper and lower order data words produced by the data manipulation logic circuitry errors made by the first and second BPUs in executing a double precision operation in parallel can be detected.

2. In the Central processor of claim 1 in which a data word consists of four bytes.

3. In the Central processor of claim 2 in which a byte consists of ten bits one of which is a parity bit.

4. In a central data processor for executing data manipulation operations on data including;
A) first and second basic processing units (BPUs), each of said BPUs having the capability of executing in parallel the same double precision data manipulation operation on the same data;
B) first and second cache units, each of said cache units having the capability of executing a plurality of cache operations including a cache data word store operation;
C) each of said first and second BPUs including;
1) data manipulation logic circuitry means for receiving data words from said cache units, with each data word consisting of an even number of bytes and each byte consisting of a given number of bits, and for executing a double precision data manipulation operation thereon to produce a high order and a low order data word;
2) buffer multiplexer means having a plurality of sections for receiving and temporarily storing data words, a first section for receiving and temporarily storing a low order data word and a second section for receiving and temporarily storing a high order data word, each of said sections being divided into an upper and a lower half word section for temporarily storing in each half word section half of the data word received by the section;

D) each of said first and second cache units including;
1) bit-by-bit comparison means to which can be connected two half data words applied to the cache unit for issuing a validating signal if the bits of the two half data words connected thereto are identical, and for issuing an error signal if they are not; and
2) random access storage means for storing a plurality of data words, said random access storage means storing a single data word applied to a cache unit while executing a cache data word store operation if the bit-by bit comparison means issues a validating signal;

E) first and second upper half data word busses;
1) said first upper half data word bus coupling the half data word stored in the upper half word section of the first section of the buffer multiplexer of the first BPU to the first cache unit; and
2) said second upper half data word bus coupling the half data word stored in the upper half word section of the second section of the buffer multiplexer of the second BPU to the first cache unit;

F) first and second lower half data word busses:
1) said first lower half data word bus coupling the half data word stored in the lower half word section of the first section of the buffer multiplexer of the first BPU to the second cache unit; and
3) said second lower half data word bus coupling the half data word stored in a lower half word section of the second section of the buffer multiplexer of the second basic processor unit to the second cache unit;

G) CPU control and support circuitry means for issuing a freeze signal to the first and second BPUs upon the receipt of an error signal from the comparison circuit means of the cache units, the receipt of said freeze signal by the first and second BPUs stopping the operation thereof;

wherein the improvements comprise:

H) each of said first and second BPUs further including;
1) an adder circuit connected to the data manipulation logic for adding the high and low order data words produced by said data manipulation logic circuitry in executing a double precision data manipulation operation to produce a sum data word;
2) an accumulator connected to the adder circuit for accumulating sum data words produced by the adder circuit to produce as an output an accumulator data word;
3) said buffer multiplexer means having a third section for receiving and temporarily storing an accumulator data word, said third section being divided into an upper and a lower half word section for temporarily storing half of an accumulator data word in each half word section;
4) circuit means for applying the half of the accumulator word stored in the upper half section of the third section of the buffer multiplexer means of the first BPU to the first cache unit, the half of the accumulator word stored in the upper half section of the third section of the buffer multiplexer means of the second BPU to the first cache unit, the half word of the accumulator word stored in the lower half section of the third section of the buffer multiplexer means of the first BPU to the second cache unit, and the half word of the of the accumulator word stored in the lower half section of the third section of the buffer multiplexer means of the second BPU to the second cache unit during if the cache unit is not performing a cache data word store operation; and
5) the bit-by-bit comparison means of each of the cache units for comparing the bits of the two halves of the two accumulator data words applied thereto and for producing an error signal if they do not compare and for producing a validating signal if they do compare; and
6) circuit means for applying error signals produced by the bit-by-bit comparison means of the cache unit to the CPU control and support circuitry means.

5. In the Central data processor as set forth in claim 4 in which a data word consists of four bytes.

6. In the central data processor as set forth in claim 5 in which each byte consists of ten bits with one bit being a parity bit.

7. In a central processor for performing double precision data manipulation operations comprising:
A) first and second basic processing units (BPUs), each of said BPUs executing the same data double precision data manipulation operations in parallel;
B) first and second cache units, each of said cache units executing a plurality of cache operations including a cache data word store operation;
C) each of said first and second basic processing units including;
1) data manipulation logic circuitry for receiving data words from said cache units, with each data word consisting of an even number of bytes and each byte consisting of a given number of bits; for performing double precision data manipulations thereon to produce a low order data word result and an high order data word result, one bit of each byte of the high and low order data word results being a parity bit;
2) data buffer register means including a plurality of sections with each section including a lower section to which is applied the low order data word result; an upper section to which is applied the high order data word result produced by said data manipulation logic circuitry, each of said upper and lower sections being divided into upper and lower half word sections for temporarily storing upper and lower half-bytes of the low order data word result and high order data words result respectively applied thereto; said data buffer register means also including a parity bit section for receiving and temporarily storing the parity bits of said high and low order data word results;

D) each of said first and second cache units including;
1) bit-by-bit comparison means for receiving first and second sets of bits, the number of bits in each set not to exceed one half the number of bits in a data word, and for issuing a validating signal if the first and second set of bits received are identical and a CPU error signal if the first and second set of bits received are not identical; and
2) random access storage means for storing a plurality of data words, said random access storage means storing a single data word transmitted to a cache unit while executing a cache data word store operation if the bit-by bit comparison means issues a validating signal;

E) first and second upper half-word busses;
1) said first upper half-word bus coupling half of a data word stored in the upper half word section of the lower word section of the first BPU to said first cache unit; and
2) said second upper half-word bus coupling half of a data word stored in the upper half word section of the upper word section of the second BPU to said first cache unit;

F) first and second lower half-word busses;
1) said first lower half-word bus coupling half of a data word stored in the lower half word section of the higher word section of the first BPU to said second cache unit; and
2) said second lower half-word bus coupling half of a data word in the lower half word section of the high order word section of the second BPU to said second cache unit;

G) first and second parity buses;
1) said first parity bus coupling the parity section of the first BPU to the bit-by-bit comparison means of one of said cache units; said second parity bus coupling the parity section of the second BPU to the bit-by-bit comparison means to which is coupled the first parity bus during a cache data word store operation; the bit-by-bit comparison means to which the parity bits from the parity sections are coupled issuing a validating signal to both cache units during a cache data word store operation if the parity bits are identical;

H) CPU control and support circuitry means for issuing a freeze signal to the first and second BPUs upon receipt of a CPU error signal, the receipt of a freeze signal by said BPUs stopping operation of said BPUs;

the improvements for detecting an error occurring in the execution in parallel of a double precision data manipulation operation by the first and second BPUs comprising:

I) each of said first and second BPUs further including;
1) an adder coupled to receive the high and low order data word results from said data manipulation logic circuitry to produce a sum data word;
2) accumulator means coupled to said adder for producing an accumulator data word by adding successively sum data words produce by the adder;
3) said data buffer register means further including an accumulator section, said accumulator portion being divided into an upper and a lower half word section for temporarily storing upper and lower half bytes of the accumulator data word applied to the buffer register means;

J) said first and second upper half word busses and said first and second lower half word busses transferring during a non-store operation of the cache units the upper half word stored in the upper half word section of the accumulator section of the first BPU to the bit-by bit comparison means of the first cache unit, the upper half word stored in the upper half word section of the accumulator section of the second BPU to the bit-by bit-comparison means of the first cache unit, the lower half word stored in the lower half word section of the accumulator section of the first BPU to the bit-by-bit comparison means of the second cache unit, and the lower half word stored in the lower half word section of the accumulator section of the second BPU to the bit-by-bit comparison means of the second cache means;

K) each of said bit-by-bit comparison means during a period of time when the cache unit is not executing a data word store operation producing a CPU error signal if the bits of the two half words applied during said period do not compare; and L) circuit means for applying any CPU error signal produced by said bit-by-bit comparison means to the CPU control and support circuitry means.

8. In the central processor as set forth in claim 7 in which a data word consists of four bytes.

9. In the central processor as set forth in claim 8 in which each byte consists of 10 bits.

* * * * *